(12) United States Patent
Chen et al.

(10) Patent No.: US 8,489,633 B2
(45) Date of Patent: Jul. 16, 2013

(54) CORRELATED QUERY PROCESS (CQP) AND PEER-TO-PEER (P2P) EXECUTION

(75) Inventors: Qiming Chen, Cupertino, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 429 days.

(21) Appl. No.: 12/399,843

(22) Filed: Mar. 6, 2009

(65) Prior Publication Data

US 2010/0228760 A1 Sep. 9, 2010

(51) Int. Cl.
*G06F 7/00* (2006.01)
*G06F 17/30* (2006.01)

(52) U.S. Cl.
USPC .................. 707/781; 707/954; 707/964

(58) Field of Classification Search
USPC .................... 707/781, 954, 964
See application file for complete search history.

(56) References Cited

U.S. PATENT DOCUMENTS

| | | | | |
|---|---|---|---|---|
| 4,930,071 A * | 5/1990 | Tou et al. | | 1/1 |
| 5,495,605 A * | 2/1996 | Cadot | | 1/1 |
| 6,349,310 B1 * | 2/2002 | Klein et al. | | 707/703 |
| 6,470,331 B1 * | 10/2002 | Chen et al. | | 707/718 |
| 6,728,694 B1 * | 4/2004 | Ramasamy et al. | | 707/714 |
| 6,847,978 B2 * | 1/2005 | Ellis et al. | | 707/713 |
| 6,957,214 B2 * | 10/2005 | Silberberg et al. | | 707/781 |
| 7,096,216 B2 * | 8/2006 | Anonsen | | 707/781 |
| 7,146,365 B2 * | 12/2006 | Allen et al. | | 1/1 |
| 7,606,792 B2 * | 10/2009 | Cunningham et al. | | 1/1 |
| 7,797,304 B2 * | 9/2010 | Muralidhar et al. | | 707/713 |
| 7,818,313 B1 * | 10/2010 | Tsimelzon et al. | | 707/718 |
| 8,032,503 B2 * | 10/2011 | Bouloy et al. | | 707/696 |
| 2002/0059425 A1 * | 5/2002 | Belfiore et al. | | 709/226 |
| 2002/0184070 A1 * | 12/2002 | Chen et al. | | 705/9 |
| 2003/0236693 A1 * | 12/2003 | Chen et al. | | 705/9 |
| 2004/0034540 A1 * | 2/2004 | Chen et al. | | 705/1 |
| 2005/0015466 A1 * | 1/2005 | Tripp | | 709/219 |
| 2006/0106825 A1 * | 5/2006 | Cozzi | | 707/100 |
| 2008/0027920 A1 * | 1/2008 | Schipunov et al. | | 707/4 |
| 2008/0195464 A1 * | 8/2008 | Brooks | | 705/11 |
| 2009/0157596 A1 * | 6/2009 | Couch et al. | | 707/1 |
| 2009/0271412 A1 * | 10/2009 | Lacapra et al. | | 707/10 |
| 2010/0094894 A1 * | 4/2010 | Dettinger et al. | | 707/764 |
| 2012/0209877 A1 * | 8/2012 | Colclasure et al. | | 707/770 |

\* cited by examiner

*Primary Examiner* — Wilson Lee
*Assistant Examiner* — Jessica N Le (57) ABSTRACT

Methods, systems, and computer program products are provided for processing correlated queries in a collaborative, role-based, peer-to-peer (P2P) execution system. A correlated query is configured in accordance to a collaborative correlated query process (CQP) template. The collaborative CQP template defines roles and steps, each step being executable by one of the roles. A role is assigned to each peer node of the P2P system. A peer node having a designated role executes a step that is executable by the designated role. A message is communicated to other P2P nodes to indicate completion of the step. Another peer node having a matching role to a next step in the correlated query executes the next step in response to the message.

12 Claims, 5 Drawing Sheets

CORRELATED QUERY PROCESS (CQP) AND PEER-TO-PEER (P2P) EXECUTION

BACKGROUND OF THE INVENTION

A trend in supporting large scale information technology (IT) applications is converging data intensive computation and data management to achieve fast data access and reduced data flow. For example, dynamic data warehousing and operational business intelligence (BI) applications involve large-scale data intensive computations in multiple stages from information extraction, modeling, and analysis to prediction. To support such applications, two IT disciplines are often deployed: high performance computing (HPC) and scalable data warehousing, both of which are based on the use of computer cluster technology and partitioning of tasks and data for parallel processing. In such an environment, parallel execution of reusable computations in Structured Query Language (SQL) applications may be used to push-down data intensive computations to a data management layer to converge computation and data.

BRIEF DESCRIPTION OF THE DRAWINGS

Embodiments of the invention relating to both structure and method of operation may best be understood by referring to the following description and accompanying drawings.

DETAILED DESCRIPTION

Novel features believed characteristic of the present disclosure are set forth in the appended claims. The disclosure itself, however, as well as a preferred mode of use, will best be understood by reference to the following detailed description of illustrative embodiments when read in conjunction with the accompanying drawings. The functionality of various modules, devices or components described herein may be implemented as hardware (including discrete components, integrated circuits and systems-on-a-chip 'SoC'), firmware (including application specific integrated circuits and programmable chips) and/or software or a combination thereof, depending on the application requirements. The accompanying drawings may not to be drawn to scale and some features of embodiments shown and described herein may be simplified or exaggerated for illustrating the principles, features, and advantages of the disclosure.

The following terminology may be useful in understanding the present disclosure. It is to be understood that the terminology described herein is for the purpose of description and should not be regarded as limiting.

System—One or more interdependent elements, components, modules, or devices that co-operate to perform one or more functions.

Configuration—Describes a set up of elements, components, modules, devices, and/or a system, and refers to a process for setting, defining, or selecting hardware and/or software properties, parameters, or attributes associated with the elements, components, modules, devices, and/or the system. For example, a cluster of servers may be configured to include $2^{**}N$ servers, N being an integer.

Framework—A basic infrastructure designed to provide one or more functions. A framework used in an information technology (IT) environment may include electronic hardware, software, and services building blocks (used as platform devices) that are designed to work with each other to deliver core functions and extensible functions. The core functions are typically a portion of the framework that may selectable but not modifiable by a user. The extensible functions are typically a portion of the framework that has been explicitly designed to be customized and extended by the user as a part of the implementation process.

Model—A model can be a representation of the characteristics and behavior of a system, element, solution, application, or service. A model as described herein captures the design of a particular IT system, element, solution, application, or service. The model can include a declarative specification of the structural, functional, non-functional, and runtime characteristics of the IT system, element, solution, application, or service. The instantiation of a model creates a model instance.

Process template—A process template is a configuration tool that may enable a user to define how a process is set up or configured. The template may permit customization for a particular application. The process template typically provides the user with a different set of default work items, work item queries, steps, reports, security groups, and guidance when a process is created using that template.

Mashups—Web applications to create web sites on an ad hoc basis based on data and functionality obtained from other web sites or other information sources.

Directed Acyclic Graph (DAG)—A DAG may be described as a directed graph that contains no cycles. A DAG, which generally includes flows in one direction, may appear in models where it may not make sense for a vertex to have a path to itself. A rooted tree may be viewed as a special kind of DAG and a DAG is a special kind of directed graph.

Considerations in Peer-to-Peer (P2P) Collaborative Information Processing

Data intensive computation may be described as a technical merge of parallel computation and scalable data management. While both parallel computing and parallel data management have made significant progress with advances in cluster technology, they are often treated separately. For scientific and other computing applications, data are stored in separate repositories and brought in for computation. For databases, applications are viewed as external clients. Very often, a task and the data to be applied by it are not co-located, causing significant overhead of data flow. Such locality mismatch is often the cause of poor performance and is considered as a major performance bottleneck.

One technique of pushing down analytical computations to a database level is to wrap applications with user defined functions (UDFs). The UDFs may be embedded in SQL statements. However, a single SQL statement may have limited expressive power at the application level, since the data flow represented in a SQL query is coincident with the control flow, especially since an application may often require additional data flows between its steps. Thus, a query tree typically represents both the data flows and control flows of its steps, but an application is often modeled with separate data flows and control flows between its steps. In order to converge data intensive computation and data management while keeping the high-level SQL interface, there is a need for the synthesis of relational operation, UDFs and business processes.

Multiple peer systems having separate data sources and different data processing capabilities may often need to work in a collaborative manner to achieve correlated goals. Present solutions including distributed query processing and peer-to-peer (P2P) query processing are primarily based on a coordination model having a central coordinator, with query result returned to the initial requester. In a truly P2P environment, peers such as a buyer and a seller often have correlated but separate goals. In enterprise information mashup applications, multiple parties having different but correlated goals may need to work collaboratively for sharing each others data and computation results. Therefore, there is a need for a multi-goal oriented, process-level collaborative P2P information processing system.

Embodiments of systems and methods for processing correlated queries in a collaborative, role-based, peer-to-peer (P2P) execution environment. Novel types of UDFs having both input and output as relations, or row sets, defined as Relation Valued Functions (RVFs), are described for seamlessly integrating applications into SQL queries.

A Correlated Query Process (CQP) is described for specifying an application by several queries and RVFs having interleaved steps. In a CQP, a query may stand for a step or be divided into multiple steps where each step represents a data transformation. This approach combines the high-level declarative semantics in the spirit of SQL, and the procedural semantics found in business processes.

A collaborative CQP is described with multiple participating peer systems in which the participating peers have correlated but separate goals. Each peer is assigned a role, and each step query is the responsibility of a designated role; the executors of step queries are self-selected by the participating peers through role-matching. Unlike traditional coordinator based distributed query processing and P2P query processing models, the logical execution of a collaborative CQP includes a set of individual peer CQP executions run by multiple participating parties, each being executed to achieve its own goal. The peer executions are based on the same CQP template with each peer being assigned a designated role. Each peer actively processes the steps belonging to that role and skips the steps not belonging to that role. The actual executor of a step forwards the return message of query execution to other peers, embedded with the query or RVF results to be visible (selected on a per peer basis), for the other peers to roll forward their own peer process executions.

The disclosure includes a section outlining a section describing a correlated query process (CQP) with RVFs, a section describing a collaborative CQP, a section describing details of a P2P collaborative execution model, and a section to describe implementation considerations.

Correlated Query Process (CQP) With Relation Valued Functions (RVFs)

Figure 1A:
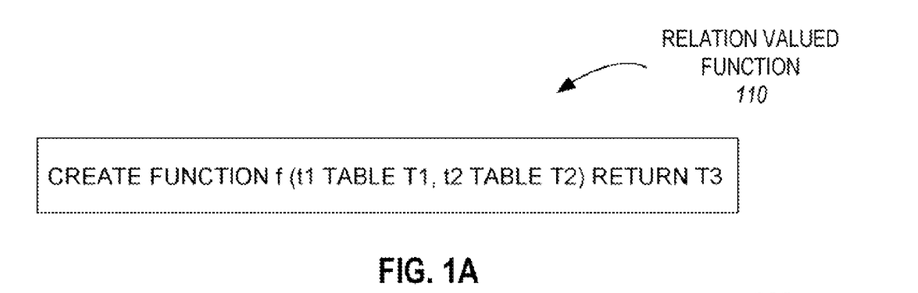
FIG. 1A illustrates a relation valued function (RVF), according to an embodiment.

FIG. 1A illustrates a relation valued function (RVF) 110, according to an embodiment. Similar to user defined functions (UDFs), RVFs provide a technique to embed data intensive computations into a SQL query. The RVF 110 may be viewed as a novel UDF having both input and output as relations. Thus, the RVF 110 may be described as a function that takes a list of relations, or row sets, as input, and returns a relation, or row set, as its execution result. In particular, the RVF 110 is defined as CREATE FUNCTION f (t1 TABLE T1, t2 TABLE T2) RETURN T3, where the schemas for T1, T2 and T3 are defined. Note the instance of T1 and T2 can be materialized rows or dynamic query results. The RVF 110 performs a relational transformation (and in addition it may also have database update effects in the function body), which may be easily composed in a SQL query. This is because a row-set can be input to an RVF, and its resulting row-set can be output to other relation operations naturally, such as: SELECT alert FROM (allert_rvf (SELECT*FROM rivers WHERE water_level> . . . )). Thus, a query can be viewed as a RVF and conversely a RVF can be viewed as a query.

To convert a UDF to a RVF, a UDF needs to wrap its input and out put to relations. The handling of output is straightforward. The following two techniques may be used to turn input parameters (i.e. argv[ ]) to a relation. For converting a list of arguments to a row set, a "system" TVF, a2r is provided that maps a CSV (comma-separated values) to a "system row-set", args, as the input of a RVF. For instance, an RVF for eq-joining row sets R, S on attributes R.A and S.B can be expressed as: eq-join (a2r("R.A, S.B"), R, S). For converting the input of a per-tuple processing UDF to a relation, CROSS APPLY introduced to T-SQL may be used. CROSS APPLY a TVF to a table (or row-set) applies the TVF to each row of the table, unions the resulting row sets, and joins the input table. In the following example, TVF, f (river_seg_id), is applied to the selected set of river segments, resulting in a row set:

SELECT*FROM river_segs WHERE river_name="Red_River" CROSS APPLY f (river_seg_id);

Therefore, cross apply a TVF to a row set, can be viewed as a RVF.

Figure 1B:
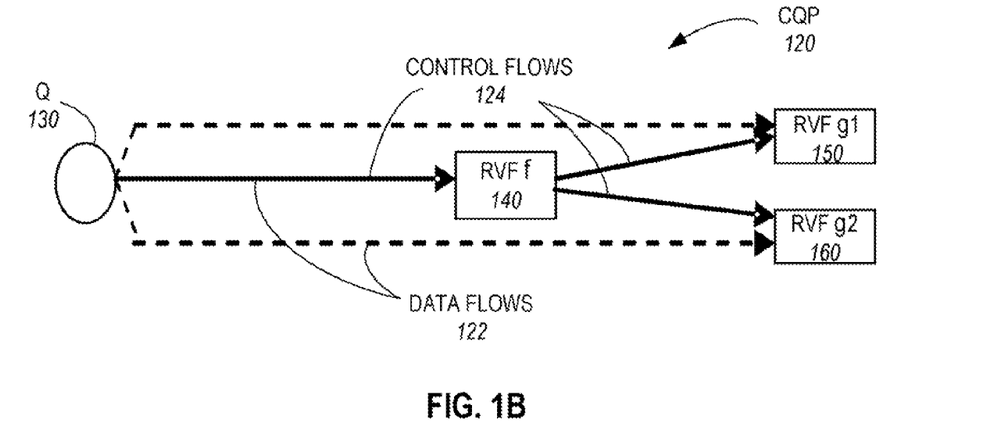
FIG. 1B illustrates a simple correlated query process (CQP) having separate data flow and control paths, according to an embodiment.

FIG. 1B illustrates a simple correlated query process (CQP) 120 having separate data flow and control paths, according to an embodiment. A SQL statement expresses the composition of several data access and manipulation functions. As described earlier, the CQP 120 may be used to specify an application by configuring several queries and RVFs having interleaved steps. In the CQP 120, a query Q 130 may stand for a step or be divided into multiple steps where each step represents a data transformation. Thus, a query execution plan may be viewed as a process that includes sequential, parallel, and nested steps or a combination thereof, thereby enabling the handling of queries at the process level. As a database centric solution, the steps may be viewed as individual SQL queries that may be executed by the underlying database engines. For modeling complex applications, the CQP 120 may include multiple correlated queries together with complex data flows and control flows that may be represented as a directed acyclic graph (DAG) rather than a single query tree. Thus, compared to a traditional business process, CQP 120 is different since it is configured by multiple SQL queries that include RVF's. Compared to a SQL query that is a tree, CQP 120 represents a graph that is more general than a tree, and includes multiple SQL queries connected through RVFs. The 'actors' in executing the CQP 120 are not arbitrary, but are the underlying peer database engines.

Additional details of a CQP in a more complex watershed application is described with reference to FIGS. 2A and 2B. Thus, the CQP 120 enables correlating multiple queries (including RVFs) into a process, thereby enabling processing of control flows separately from data flows.

Referring back to FIG. 1B, an application is modeled as the query Q 130, followed by a RVF f 140 that takes Q's results as input, then followed by RVFs g1 150 and g2 160 which take f's as well as Q's results as input. Data flows 122 (illustrated by solid and dashed lines) and control flows 124 (illustrated by solid lines) of this application are not coincident. In order to express data flows 122 separately from control flows 124, and to ensure the involved query Q 130 and RVF f 140 to be executed only once, this application may not be expressed by a single SQL statement, but by a list of correlated queries at the process level. Conceptually the data dependency depicted in FIG. 3B can be expressed as a sequence <Q, f, g1, g2> meaning that Q 130 should be provided before f 140, and so on. This data dependency sequence may not be unique since <Q, f, g2, g1> is another possibility. The control flow 124 can be expressed by [Q, f, [g1, g2]] where [g1, g2] can be executed in parallel.

Thus, the CQP 120 may include one or more correlated SQL queries, referred to as query steps, which may be sequential, concurrent, nested or a combination thereof. A query step can be an RVF or a query containing RVFs (other UDFs may be included). The CQP 120 represents a data intensive application at the process level where data flows 122 are allowed to be separated from control flows 124, and multiple start and exit points are allowed.

Figure 2A:
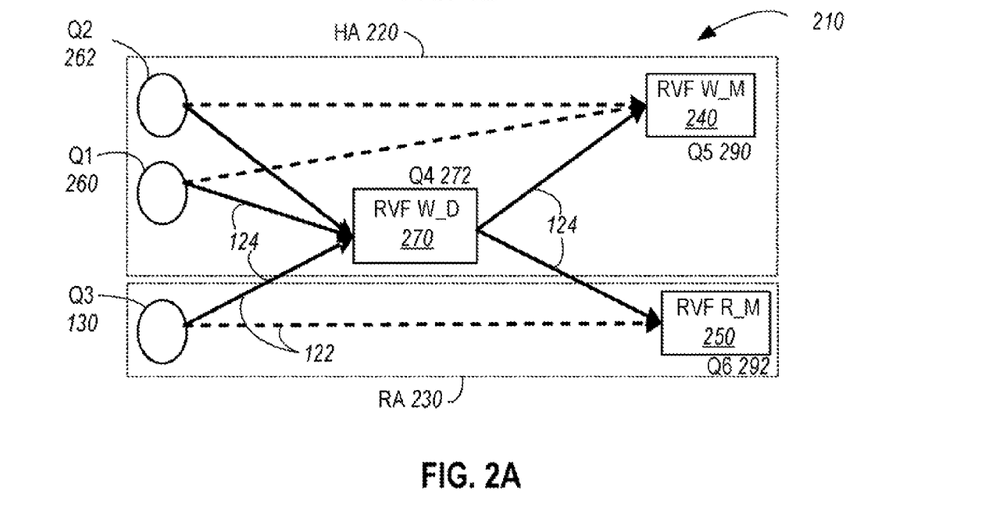
FIG. 2A illustrates a block diagram of a P2P collaborative CQP for an enterprise mashup application, according to an embodiment.

FIG. 2A illustrates a block diagram of a P2P collaborative CQP 210 for an enterprise mashup application, according to an embodiment. In a particular embodiment, the enterprise may be a river management authority that may collect data (such as rainfall, reservoir level, flow rate, discharge volume, and others) from various inputs or sensors to manage the water resources. The data, may be stored in a database. Computation results, which may utilize the data, may be stored in the same underlying databases to be retrieved for analysis, mash-up and visualization. Applications like enterprise mashups often require evaluating correlated queries collaboratively with peers for sharing data and computation capabilities mutually. Described below is an example of the P2P collaborative CQP 210 being processed within a hydrologic application. A hydrologic application may include two organizations—a hydrologic agency (HA) 220 and a reservoir management agency (RA) 230 each of which plays a designated role in the overall enterprise mashup application. HA 220 may be responsible for providing water drainage network monitoring and RA 230 may be responsible for reservoir related operation such as release water for being used by agricultural, industrial, household, and other uses. The two organizations may operate independently but may have correlated goals. It is understood that the hydrologic application may include greater number of organizations.

HA 220 and RA 230 collaborate on retrieving, processing and integrating information, for generating individually targeted mashup datasets generated in response to processing a watershed_mashup 240 RVF and a reservoir_mashup 250 RVF. A mashup dataset may be stored in a table with fields for GML (Graphic Mark Language) expressing "feature objects", layout information, URLs to external Web pages such as NASA's satellite images, and others, to be provided to a mashup engine for generating a presentation level display. Each organization (e.g., HA 220 and RA 230) may have its own goal of mashup, but they depend on each others data and scientific computation capabilities to generate the enterprise mashups. It would be desirable that the collaboration be carried out at the process level.

In a simplified scenario for generating enterprise mashups, HA 220 computes the water volume and water level distribution based on rainfall, discharge, evaporation. To process the watershed_mashup 240 RVF to support its own goals, HA 220 also needs water release data from RA 230. RA 230 processes the reservoir_mashup 250 RVF for its own purpose, based on the computation results provided by HA 220, the reservoir water management related information, as well as other data from Web. As such it relies on the data and computation results from HA 220.

HA 220 includes the following tables in a database, hadb: river_segments table for static river segment data, rainfall_guage_readings table for incoming water to river segments, and stream_guage_readings table for outgoing water from river segments. RA 230 includes the following tables in a database radb: water_management table for water release and other water management data. The application includes processing of the simplified queries Q1 260, Q2 262, Q5 290 associated with HA 220, Q3 464, Q6 292 associated with RA 230, RVFs water_distribution 270, watershed_mashup 240, and reservoir_mashup 250.

Specifically, the simplified queries may include:
Q1: SELECT river_seg, date, SUM(rainfall) FROM rainfall_guage_readings GROUP BY river_seg, date
Q2: SELECT a.river_seg, b.date, b.discharge_rate FROM river_segments a, stream_guage_readings b WHERE a.region=b.region
public Q3: SELECT river_seg, water_release_volume FROM water_management. (Public denotes shareable with others). RVF Water_distribution 270 is associated with HA 220 and has database update effects. The RVF takes the resulting row sets of Q1, Q2 on HA side and Q3 on RA side as input and computes the information on water distribution. Its results may be retrieved by Q4 272 configured as:
public Q4: SELECT*FROM Water_distribution (Q1, Q2, Q3). RVF Watershed_mashup 240 is associated with HA 220 that takes the results of Q1, Q2 and RVF Water_distribution 270 as input, retrieves satellite images from Web, and generates data to be mashed up for HA 220. Its result may be expressed by Q5 290 as:
Q5: SELECT*FROM Watershed_mashup (Q1, Q2, Q4). RVF Reservoir_mashup 250 is associated with RA 230, that takes the results of Q3 and RVF Water_distribution as input, retrieves data from Web, and generates data to be mashed up for RA 230. Its result can be retrieved by Q6 292 as:
Q6: SELECT*FROM Reservoir_mashup (Q3, Q4).

Thus Q5 290 and Q6 292 are correlated queries representing the desired information needed by HA 220 and RA 230 organizations working in a collaborative manner. Q5 290 and Q6 292 are described as being correlated queries since they need each other's query or computation results during the processing. They may not be processed individually since RVF Water_distribution 270 has database update effects and therefore may not be executed more than once. Therefore, Q5 290 and Q6 292 are to be processed interactively with additional and separate data flows 122 (illustrated by solid and dashed lines) and control flows 124 (illustrated by solid lines) compared to a simple query tree. Instead by query trees, the collaborative CQP 210 is represented by a DAG, and Q5 290 and Q6 292 are processes at the process level.

In a particular embodiment, the collaborative CQP 210 may include the following SQL code:

```
CREATE QUERY PROCESS co_mashup (
    ROLES HA, RA;
    QUERY STEPS (    //data flow, step role
        Q1 BY HA: SELECT river_seg, date, SUM(rainfall)
    FROM rainfall_guage_readings GROUP BY river_seg, date;
        Q2 BY HA: SELECT a.river_seg, b.date, b.discharge_rate
    FROM river_segments a, stream_guage_readings b
    WHERE a.region = b.region;
        public Q3 BY RA: SELECT river_seg, water_release_volume
             FROM water_management;
        public Q4 BY HA: SELECT * FROM Water_distribution
(Q1, Q2, Q3);
        Q5 BY HA: SELECT * FROM Watershed_mashup
        (Q1, Q2, Q4);
        Q6 BY RA: SELECT * FROM Reservoir_mashup (Q3, Q4);
    )
    SEQUENCE (    //control flow, concurrency
        [Q1, Q2, Q3], Q4, [Q5, Q6];
    )
).
```

Thus, the collaborative CQP 210 expresses the collaboration of multiple peers with specific but correlated goals at the query process level. The data flows and the control flows in the CQP 210 include at least one data flow that is separate and distinct from at least one control flow. The collaboration of multiple peer participants may be implemented by using a cluster of servers to form a P2P collaborative CQP processing system. Additional details of the system are described with reference to FIGS. 4 and 5.

Figure 2B:
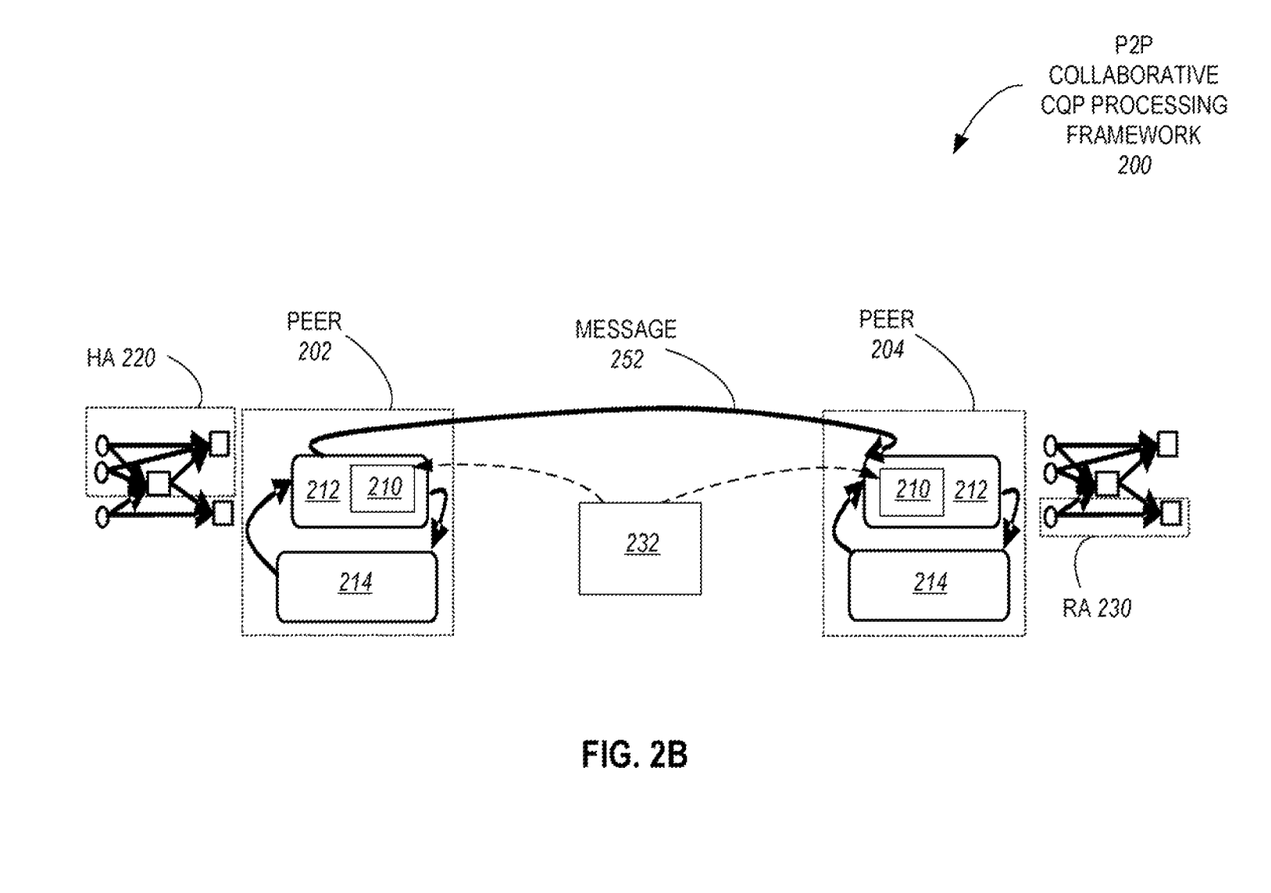
FIG. 2B illustrates a block diagram of a P2P collaborative CQP processing framework, according to an embodiment.

FIG. 2B illustrates a block diagram of a P2P collaborative CQP processing framework 200, according to an embodiment. In the depicted embodiment, the P2P collaborative CQP processing framework 200 includes at least two participating peers (or nodes) 202 and 204 coupled to one another. It is understood that the P2P collaborative CQP processing framework 200 may include greater number of participating peers. The P2P collaborative CQP processing framework 200 provides tools and techniques such as a common template that defines roles and steps for each peer, each step being executable by one of the roles, role based collaboration, and providing visibility to query results to achieve step synchronization. Additional details of a systems architecture based on a convergent cluster for implementing collaborative CQP is described with reference to FIG. 4.

Each one of the peers 202 and 204 includes a CQP handler 212 to process a CPQ in a collaborative manner. Each one of the peers 202 and 204 also includes a database management system (DBMS) 214 to perform database layer functions. The CQP handler 212 communicates with one another by communicating a message 252 and communicates with the DBMS 214 to send a query and receive results of the query.

A collaborative CQP template 232 is defined and commonly agreed by the participating parties. For example, the collaborative CQP template 232 may be instantiated to generate the P2P collaborative CQP 210 described with reference to FIG. 2A as an instance. The CPQ handler 212 is operable to process the P2P collaborative CQP 210. The template 232 includes one or more sequential, parallel, nested steps or a combination thereof. Each step can be accomplished by a SQL query where RVFs may be invoked for embedding application level computations. The output of a step query is named which can be specified as the input of another step. Each participating peer 202 and 204 may have a specific goal, but the goals of the participating peers are correlated and they depend on each other's effort to reach these goals.

A collaborative CQP may include a list of process-roles, indicating the logical participants. A step query has a step-role that matches one of the process-roles. For example, given process roles A and B, a step query can have role A or B. For simplicity, a single role being played by multiple players is not enabled. The execution of the collaborative CQP 210 by the framework 200 involves multiple concurrent peer executions, where each peer 202 and 204 is responsible for the step queries matching its role, and the participating peers synchronize the step executions through messaging. This technique is different from the current coordinator based execution models found in distributed query processing.

When executing the collaborative CQP 210, each peer 202 and 204 can keep some of the query results or RVF results private by configuring a role based sharing scope of a step query. The result of a step query may be public, e.g., sharable by all process-roles or role specific. A role-specific result may be visible only to the peers assigned the given roles (one or more). By default a local result is visible to the local peer.

The logical execution of the collaborative CQP 210 by the framework 200 includes a set of individual peer CQP executions run by the participating parties. These peer executions are based on the same CQP template 232. Each peer 202 and 204 is assigned a designated role. Each peer 202 and 204 actively executes the steps that belong to the designated role, and skips (e.g., passively executes) the steps not belonging to that role. A peer, which is an executor of a step query, receives a return message, rmsg, from the local database engine, e.g., DBMS 214, containing the execution status and results. The peer 202 or 204 simply forwards this rmsg to the participating peers as message 252 for synchronizing the executions of their peer processes, while for each peer, it encloses in the forwarded rmsg only the query results visible to it. The local process execution in the peer rolls forward to the next step upon receipt of rmsg from the current step execution, the peer process executions also roll forward to the next step upon receipt of the message 252. For any peer, if a step query does not belong to its role it is skipped, e.g., as a passive step, and no rmsg is returned. Instead, this peer waits to receive message 252 to move to the next step. The rmsg message may include the following information: global execution ID of the logical CQP execution, local IDs of the peer CQP execution and the step query execution, step query execution status, and the resulting row set (which may not be forwarded to all peers).

When a collaborative CQP such as the collaborative CQP 210 is defined, it is specified with the process-roles and step-roles. When a logical execution is created, the players (peers) and the roles they play are configured. The framework 200 at the creating party obtains a global execution ID for this logical execution, creates a peer execution for itself, and associates this ID with its peer execution. When the framework 200 at the creating party sends requests to other peers (e.g., other players of the CQP) to instantiate the peer executions, the global execution ID is also specified. This global execution ID is encapsulated in all the messages on the above logical execution, and transferred to all peer sides to correlate peer executions of the collaborative CQP execution. During the process execution, the step queries are "processed" at all the peer executions. However, for a specific step query, if the peer role matches its step role, it is actively executed, otherwise it is skipped. After each active execution of a step query, a status massage is returned to the execution site, and propagated as the message 252 to all the other participating sites for synchronize the peer executions. Upon receipt of this message 252, all the peer executions roll forward to the next step. Step query results may be exchanged with the above return message according to the visibility of peer roles to the data.

In a particular embodiment, HA 220 functionality may be implemented in peer 202 and RA 230 functionality may be implemented in peer 204. The collaborative CQP 210 may be processed as follows: HA 220 and RA 230 honor the same CQP template 232 but each side has its own a peer instance, and a designated role for the execution. Referring back to FIG. 2A, the steps belong to the corresponding role are illustrated. A peer CQP execution is initiated by HA 220, representing the process-role of HA, and through messaging, HB 230 is requested to create a counterpart peer execution (e.g., generate a local instance). Based on role-matching, HA 220 actively executes step queries Q1 260, Q2 262 and skips Q3 463. RA 230 actively executes Q3 464 and skips Q1 260 and Q2 262. The rmsgs from each step execution is forwarded as message 252 to the other player of the process, for it to update their peer process state and schedule the possible next step of their own peer execution. Thus peer CQP executions are carried out step by step in a P2P manner without deploying a coordinator node.

Methods for Collaborative Data Processing

Figure 3A:
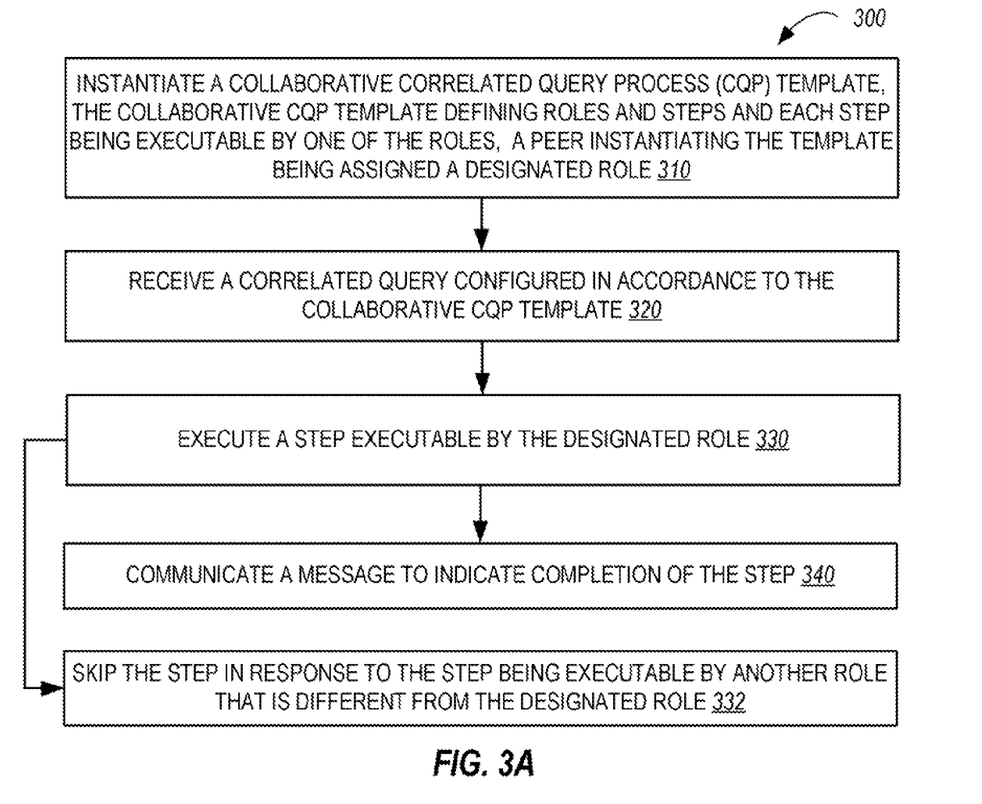
FIG. 3A illustrates a flow chart of a method for processing a collaborative correlated query, according to an embodiment.

FIG. 3A illustrates a flow chart of a method 300 for processing a collaborative correlated query, according to an embodiment. In a particular embodiment, the method 300 is used for processing the collaborative CQP 210 described with reference to FIGS. 4A and 4B.

At process 310, a collaborative correlated query process (CQP) template is instantiated. The collaborative CQP template defines roles and steps and each step is executable by one of the roles. A peer instantiating the template is assigned a designated role. At process 320, a correlated query configured in accordance to the collaborative CQP template is received. At process 330, a step executable by the designated role is executed. At process 340, a message is communicated to indicate completion of the step.

Figure 3B:
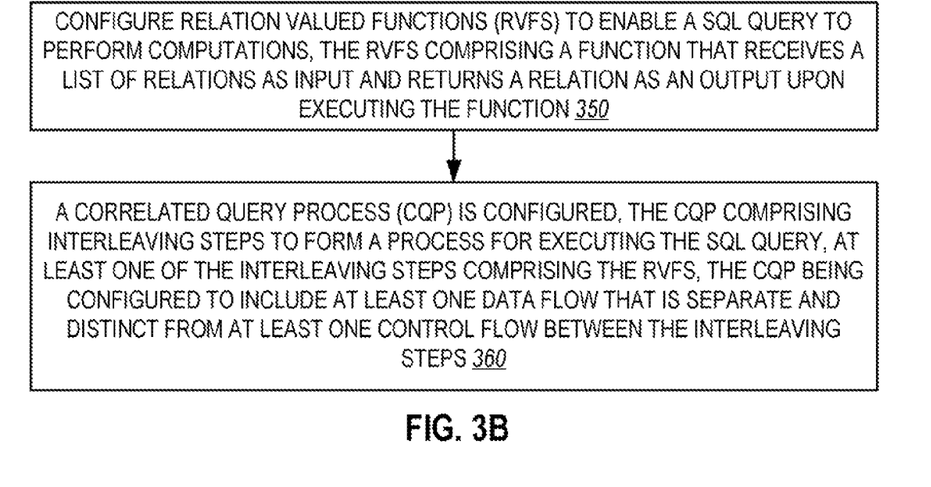
FIG. 3B illustrates a flow chart of a method for configuring a correlated query process embedded with relation valued functions (RVFs), according to an embodiment.

FIG. 3B illustrates a flow chart of a method 302 for configuring a correlated query process embedded with relation valued functions (RVFs), according to an embodiment. In a particular embodiment, the method 302 is used for configuring the CQP 120 described with reference to FIGS. 1A and 1B.

At process 350, relation valued functions (RVFs) are configured to enable a SQL query to perform computations, the RVFs comprising a function that receives a list of relations as input and returns a relation as an output upon executing the function. At process 360, a correlated query process (CQP) is configured, the CQP comprising interleaving steps to form a process for executing the SQL query, at least one of the interleaving steps comprising the RVFs, the CQP being configured to include at least one data flow that is separate and distinct from at least one control flow between the interleaving steps.

With reference to the methods 300 and 302, it is understood, that various steps described above may be added, omitted, combined, altered, or performed in different order. For example, in the method 300, process 332 may be added after process 330 if the step is not executable by the designated role. Specifically, the step is skipped in response to the step being executable by another role that is different from the designated role.

Implementation Considerations

Architecture Based on a Convergent Cluster

Figure 4A:
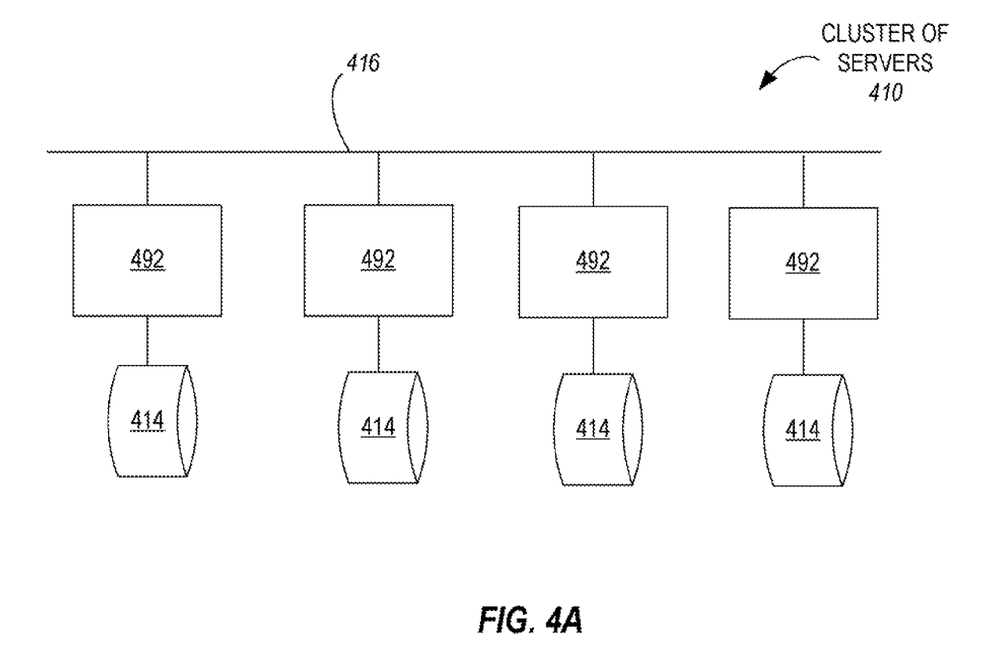
FIG. 4A illustrates a cluster of servers to implement an enterprise mashup application described with reference to FIGS. 2A and 2B, according to an embodiment.

FIG. 4A illustrates a cluster of servers 410 to implement the enterprise mashup application described with reference to FIGS. 2A and 2B, according to an embodiment. The cluster of servers 410 includes one or more servers 492 (also referred to as computational devices or computational servers) coupled by a communication network 416 to carry out a class of space-time oriented data intensive hydrologic computations that are performed periodically or on demand with near-real-time response (e.g., responsive in a time frame that is soon enough to take a corrective action). The river management application, like many other earth information systems, may be implemented as a cluster technology based HPC system. Additional details of the implementation aspects of a cluster technology based HPC system architecture is described with reference to FIG. 4B.

Figure 4B:
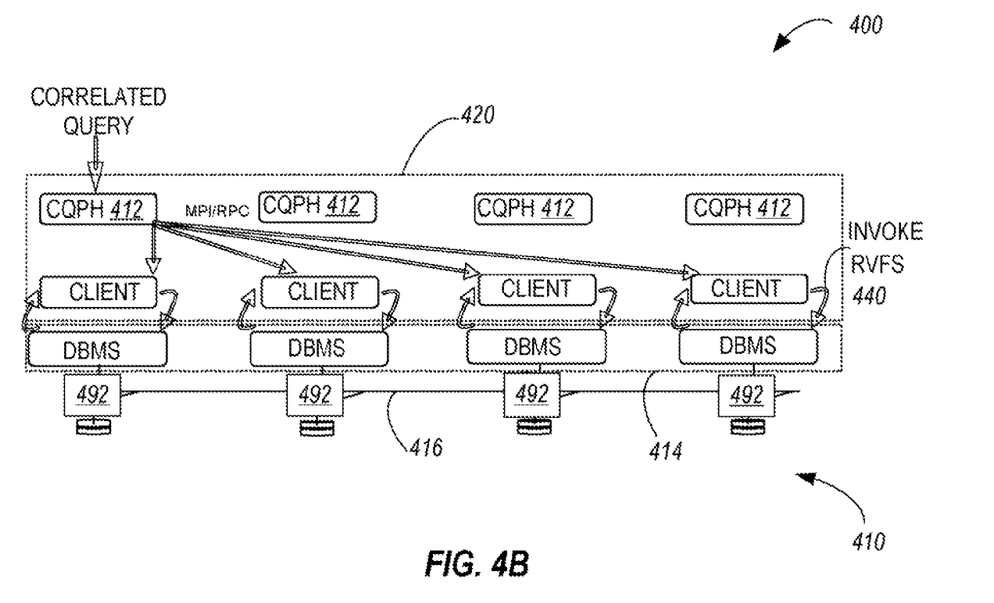
FIG. 4B illustrates a system architecture based on a convergent cluster for implementing a collaborative CQP described with reference to FIGS. 1A, 1B, 2A and 2B, according to an embodiment.

FIG. 4B illustrates a system architecture 400 based on a convergent cluster for implementing a collaborative CQP described with reference to FIGS. 1A, 1B, 2A and 2B, according to an embodiment. The cluster platforms of parallel data management and parallel computing may be converged, for shared resource utilization, for reduced data movement between database and applications, and for mutually optimized performance.

For parallel data management, implementation options may include a selection between using a parallel database or multiple individual databases, with the latter being selected for the watershed application. As described with reference to FIG. 4A, a single cluster of server machines for both parallel data management and parallel computing may be selected for implementation. The cluster of servers 410 may contain N nodes (for e.g., N=4, 16, 128, 256, . . . ) interconnected by high-bandwidth communication network 416. The clustered server nodes 410 may execute individual share-nothing relational DBMS 414; data are partitioned to multiple databases based on their domain specific properties, allowing the data access throughput to increase linearly along with the increase of server nodes. The server nodes 410 form one or more cliques in data accessing, allowing a data partition to be visible to multiple nodes, and a node to access multiple data partitions. This arrangement is desired for simplifying inter-node messaging and for tolerating faults. The MPI/RPC protocol may be utilized for messaging.

The computation functions may be implemented as database user defined functions (UDFs) and RVFs 110 for co-locating data intensive computation and data management.

While employing multiple server nodes and executing multiple DBMSs, the convergent cluster architecture offers application a single system image transparent to data partitioning and execution parallelization. This may be accomplished by building a Virtual Software Layer (VSL) 420 (layered on top of DBMS 414 layer), the VSL 420 layer providing services for dealing with data access from multiple underlying databases, and services for handling task partition and scheduling.

The VSL 420, which resides at each server node, includes the CQP handler 412 described with reference to FIGS. 2A and 2B. The layering of the CQP handler 412 above the DBMS 414 enables non-coordination based true P2P data processing technique and in addition it elevates UDF type data intensive applications from query level to collaborative process level.

The CQP handler 412 becomes the communicator of the participating DBMSs. Their properties relating to such communications such as domain names, local names and protocol, is visible to peers. In addition, when executing a CQP a logical identifier, global execution ID, for the execution is obtained, that is used to identify a logical instance of execution for correlating and synchronizing the multiple peer executions. All the messages exchanged for that execution are marked by that unique global execution ID. This may be desired to distinguish the multiple concurrent peer executions run by a CQP handler. The CQP handler 412 maintains a mapping table between the global ID and the local ID for each CQP execution. When the message 252 relating to the execution of a CQP is received, the global execution ID is used to identify the corresponding local execution.

The CQP handler 412 may be treated as a virtual database layer since it relies on the underlying database (e.g., DBMS 414) to store intermediate results (e.g., in terms of temporary tables). The CQP handler 412 also relies on the operational environment of the underlying databases for authorization, cache management, garbage collection, and others. Many of the functions performed at the VSL 420 (including the CQP handler) layer may be directly implemented using UDFs.

Task Scheduling

The CQP handler 412 included in the VSL 420 layer is provided with activity scheduling capability based on the DAG graph process model. An activity may be simply described as a query or RVF invocation. A query is dispatched to the underlying database. RVFs 110 may be limited to those equivalent to R CROSS APPLY f( ) where R is a table and f is a tuple oriented UDF for them to be push-down to certain database engines (e.g., SQL Server, My SQL).

The computation functions, e.g., UDFs and RVFs 110 are made available on all the server nodes. Further, each client may be provided with a RVF invoker 440 and an ODBC connector.

Thus, the system architecture 400 enables extending SQL framework for converging data intensive computation and data management. This may be accomplished by lifting query answering to the process level, and providing a model for processing multi-goal based, truly P2P collaborative information applications. The system architecture 400 provides unique functionality viewed from a business process, query processing, and P2P execution perspective. When viewed from a business process perspective, multiple DBMSs collaborate to execute a new type of business process where all tasks are queries and RVFs. When viewed from a query processing perspective, the dataflow is interleaved across multiple DBMSs. From a P2P execution perspective, peer CQP executions are carried out step by step in a P2P manner without deploying a coordinator node.

Figure 5:
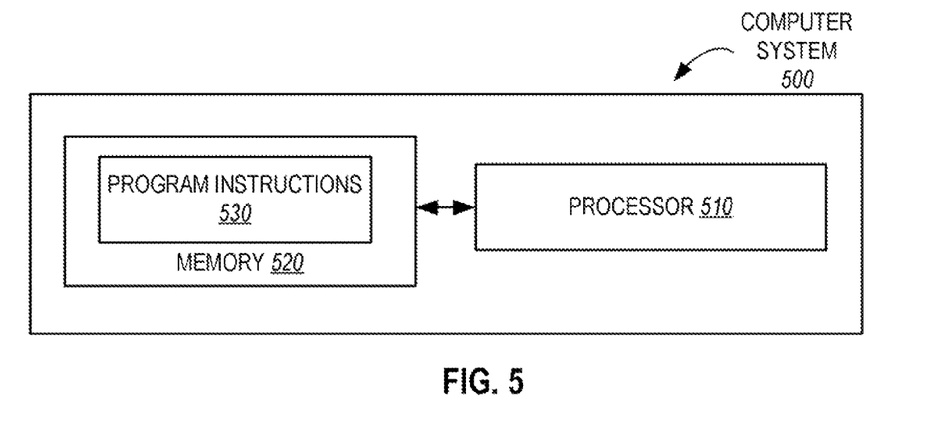
FIG. 5 illustrates a block diagram of a computer system, according to an embodiment.

FIG. 5 illustrates a block diagram of a computer system 500, according to an embodiment. The computer system 500 includes a processor 510 coupled to a memory 520. The memory 520 is operable to store program instructions 530 that are executable by the processor 510 to perform one or more functions. It should be understood that the term "computer system" is intended to encompass any device having a processor that is capable of executing program instructions from a computer-readable medium such as memory devices and storage devices. In a particular embodiment, the various functions, processes, methods 300 and 302, the P2P collaborative CQP 210, framework 200, system 400, and operations described herein may be implemented using the computer system 500. For example, the enterprise mashup application and components thereof, e.g., the cluster of servers 410, may be implemented as program instructions 530 using one or more of the computer system 500.

The various functions, processes, methods, and operations performed or executed by the system 500 can be implemented as the program instructions 530 (also referred to as software or simply programs) on computer readable medium that are executable by the processor 510 and various types of computer processors, controllers, microcontrollers, central processing units, microprocessors, digital signal processors, state machines, programmable logic arrays, and the like. In an exemplary, non-depicted embodiment, the computer system 500 may be networked (using wired or wireless networks) with other computer systems.

In various embodiments the program instructions 530 may be implemented in various ways, including procedure-based techniques, component-based techniques, object-oriented techniques, rule-based techniques, among others. The program instructions 530 can be stored on the memory 520 or any computer-readable medium for use by or in connection with any computer-related system or method. A computer-readable medium is an electronic, magnetic, optical, or other physical device or means that can contain or store computer program logic instructions for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, a watershed computation application is described. It is understood that the methods and systems described herein may be applied in all collaborative data processing applications. The illustrative techniques may be used with any suitable data processing configuration and with any suitable servers, computers, and devices. In the claims, unless otherwise indicated the article "a" is to refer to "one or more than one".

What is claimed is:

1. A computer system comprising:
multiple peer computers, comprising a first peer and a second peer; and
a tangible, non-transitory computer readable storage media storing logic instructions that are executable by the first peer to cause the first peer to:
instantiate a collaborative correlated query process (CQP) template, the collaborative CQP template defining multiple roles and multiple query steps, each of the multiple query steps being executable by one of the multiple peer computers, wherein each of the multiple peer computers is assigned one of the multiple roles, and wherein the first peer is assigned a first designated role of the multiple roles;

receive a correlated query being divided into the multiple query steps and being configured in accordance to the collaborative CQP template;

configure the correlated query to include a relation valued function (RVF), the RVF comprising a function that receives a list of relations as an input and returns a relation as an output upon executing the function;

execute one of the multiple query steps that belongs to the first designated role and skip other query steps in the multiple query steps; and communicate a message to indicate completion of the one of the multiple query steps.

2. The system of claim 1, wherein each of the multiple peer computers executes a different one of the multiple query steps.

3. The system of claim 1, the logic instructions further causing the first peer to:

communicate the message to the multiple peer computers coupled to the first peer, each one of the multiple peer computers executing an instance of the collaborative CQP template.

4. The system of claim 3, the logic instructions further causing the first peer to:

collaborate with the multiple peer computers to concurrently execute the correlated query, the concurrent execution of the multiple query steps being in accordance to the multiple roles assigned to each one of the multiple peer computers.

5. The system of claim 3, the logic instructions further causing the first peer to:

execute the correlated query in accordance to a directed acyclic graph (DAG), the DAG being configured to indicate data flows and control flows, the correlated query being collaboratively processed by using at least two of the multiple peer computers.

6. The system of claim 5, the logic instructions further causing the first peer to:

configure the data flows and the control flows to include at least one data flow that is separate and distinct from at least one control flow.

7. The system of claim 3, wherein the second peer executes a next query step included in the correlated query, the next query step corresponding to a second designated role assigned to the second peer, the next query step being executed by the second peer in response to the message received.

8. The system of claim 3, the logic instructions further causing the first peer to:

assign one of the multiple roles to each of the multiple peer computers; and assign, to each of the multiple peer computers, selected ones of the multiple query steps executable by the one of the multiple roles.

9. The system of claim 1, the logic instructions further causing the first peer to:

generate a global execution identifier for execution of the one of the multiple query steps, the global execution identifier being included in the message.

10. The system of claim 1, the logic instructions further causing the first peer to:

convert a user defined function (UDF) to the RVF by converting an input of the UDF to a relation and an output of the UDF to another relation.

11. The system of claim 1, the logic instructions further causing the first peer to:

configure the multiple query steps for execution in at least one of a sequential, concurrent, and nested manner or a combination thereof.

12. The system of claim 1, the logic instructions further causing the first peer to:

represent the CPQ template as a directed acyclic graph (DAG) rather than a query tree.

* * * * *

UNITED STATES PATENT AND TRADEMARK OFFICE
CERTIFICATE OF CORRECTION

PATENT NO. : 8,489,633 B2
APPLICATION NO. : 12/399843
DATED : July 16, 2013
INVENTOR(S) : Qiming Chen et al.

It is certified that error appears in the above-identified patent and that said Letters Patent is hereby corrected as shown below:

In the Claims

In column 14, line 36, in Claim 12, delete "CPQ" and insert -- CQP --, therefor.

Signed and Sealed this
First Day of October, 2013

Teresa Stanek Rea
*Deputy Director of the United States Patent and Trademark Office*